March 5, 1929. J. W. FORCE 1,704,501
AUTOMATIC CUT-OFF AND GAUGE VALVE FOR OIL TANKS AND THE LIKE
Filed Dec. 5, 1927
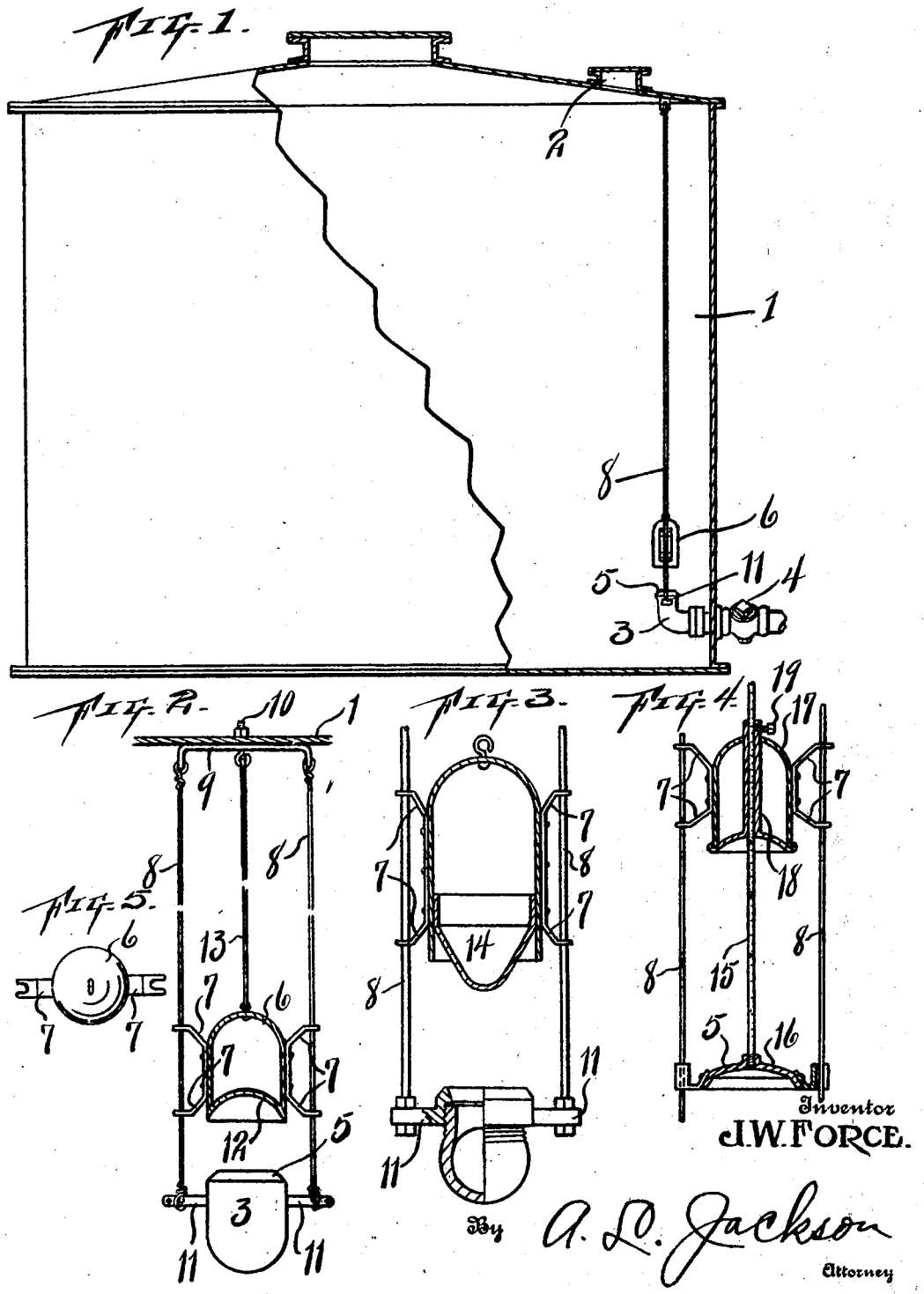

Patented Mar. 5, 1929.

1,704,501

UNITED STATES PATENT OFFICE.

JOHN W. FORCE, OF WICHITA FALLS, TEXAS.

AUTOMATIC CUT-OFF AND GAUGE VALVE FOR OIL TANKS AND THE LIKE.

Application filed December 5, 1927. Serial No. 237,806.

My invention relates to automatic cut-off valves for oil storage tanks and the like and more particularly to valves for closing a pipe line against the admission of air; and the object is to equip oil storage tanks with valves which will permit the oil to flow out of the tank as the oil is being pumped but will be automatically closed when the oil is exhausted so that air cannot enter the pipe line. This valve is particularly useful where fluid is stored in a number of tanks from which the fluid is to be pumped by a common pumping apparatus to a central or common reservoir.

If the pipe line to any one of the fluid containing tanks was allowed to remain open after the oil was pumped out, the pumping apparatus would then simply pump air and no fluid would be pumped from any of the other tanks. The object of this invention is to provide valves which will automatically close the storage tanks against the admission of air instantly as the fluid is exhausted from the tanks.

Reference is had to the accompanying drawings which form a part of this application.

Fig. 1 is a side elevation of an oil tank partly broken equipped with the improved valve.

Fig. 2 is a detail view of the valve operating mechanism.

Fig. 3 is a detail view, showing a variation for use in case of extreme high vacuum.

Fig. 4 is a detail view of another variation showing provision for gauging the amount of oil or other fluid which is required to be discharged and to cut off the flow automatically after the discharge.

Fig. 5 is a plan view of the float valve.

Similar characters of reference are used to indicate the same parts throughout the several views.

The tank 1 is provided with a filling nozzle 2 and a discharge pipe or nozzle 3 which is provided with a suitable cut-off cock 4. A valve seat 5 is formed on the nozzle 3. A float valve 6 is provided for closing and opening the nozzle 3. The nozzle 3 is provided with spring guide arms 7 and guide rods 8 which are attached to the upper part of the tank by a hanger 9 which is supported by an eyebolt 10. The rods 8 are attached to arms 11 which are formed on the discharge 3. The bottom 12 of the float 6 forms a cap for closing the discharge 3 by engaging the seat 5. The valve 6 is suspended by a cord or chain 13. The float valve will rest normally on the seat 5 until it is raised by the cord or chain 13. The cord or chain is raised manually by thrusting the hand through the filling nozzle 2.

The valve 14 is made stronger for use where there is extremely high vacuum created by the pumping apparatus. The valve 14 is made stronger by its shape and may be made thicker. This valve 14 engages the seat 15 to close the fluid passage. The valve 14 is operated in the same manner as valve 6.

The variation shown in Fig. 4 includes a gauge line or bar 15 which is graduated in foot measurements which may be graduated in fractions of a foot or inches. The valve 16 operates in the manner as valve 12, but the float member 17 is set at different heights on the bar or gauge line 15. If the float member 17 should be let down until it is seated on the valve 16, the operation would be the same as the devices shown in Figs. 1 and 2. The float member 17 can be set at one foot, two feet, three feet or more, according to requirements. The wire, rod, or bar 15 is attached to the float member 17 by means of a sleeve 18 and a set screw 19. In operation, the valve 16 will be opened and the liquid will flow out and will continue to flow out and the float member 17 will follow the surface of the liquid down and carry the valve 16 down at the same time. When the liquid has been discharged until the surface of the liquid lets the float 17 down to the point in feet or inches at which the float 17 has been set on the bar or gauge line 15, the valve 16 will be automatically closed as soon as the float 17 has descended the distance indicated by the float's position on the line gauge 15. The amount of oil left in the tank will be definitely determined by the operation of the gauge cut-off valve.

What I claim, is,—

1. In a storage tank, a discharge having a valve seat formed on its receiving end, a float valve adapted to engage said seat, lugs formed on said discharge, guide arms for said valve, guide rods attached to the roof of the tank and to said lugs to be engaged by said arms for guiding the vertical movement of said valve, said valve being adapted to move vertically on said rods and to follow the surface of liquid downwardly and to engage said seat for sealing the tank discharge against the passage of air, and means for releasing said valve from said seat.

2. In a storage tank, a discharge for said tank having a valve seat formed on its receiving end and provided with laterally projecting lugs, a float and valve provided with guide arms, guide rods attached to the roof of the tank and to said lugs to be engaged by said arms, said float being adapted to move vertically on said guide rods and to follow the surface of liquid downwardly in said tank and said valve adapted to engage said seat, and a valve release and gauging rod attached to said valve for cutting off the flow of liquid from said tank for leaving a predetermined amount of liquid in the tank.

3. In a storage tank, a discharge for said tank having a valve seat formed thereon and provided with laterally projecting lugs, a float controlled valve provided with guide arms, guide rods attached to the roof of the tank and to said lugs to be engaged by said arms, said float being adapted to follow the surface of the liquid downwardly in said tank and to cause said valve to engage said seat, and a valve release and gauging rod fixedly connected to said float and valve for cutting off the flow of liquid from said tank for leaving a predetermined amount of liquid in said tank.

In testimony whereof, I set my hand, this 28th day of November, 1927.

JOHN W. FORCE.